Patented May 2, 1933

1,906,941

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Original application filed December 4, 1929, Serial No. 411,665. Divided and this application filed September 24, 1931. Serial No. 564,979.

This invention relates to the treatment of rubber and similar materials, more particularly to a treatment of the same with the reaction product of a ketone and certain aromatic amine or amino compounds, or with certain derivatives of the same. The invention also relates to the products of such treatment.

This case is a division of case Serial No. 411,665, filed Dec. 4, 1929.

An object of this invention is to provide materials having the property of retarding the deterioration of rubber. Other objects will be apparent from the following detailed description.

Accordingly the invention comprises treating rubber or similar materials with the reaction product of a ketone and a di-(arylamino) arylene compound.

The following ketones may be used: phorone, diethyl ketone, benzo phenone, acetophenone, dichlor acetone, aldol acetone, allyl-acetone, benzal acetone, diacetyl, acetyl-acetone, acetonyl-acetone, salicylaldehyde-acetone, furfural-acetone, mesityl oxide, diacetone alcohol, methyl ethyl ketone, ethylidene acetone and formaldehyde-acetone reaction product. The following aromatic amino compounds may be used: sym-diphenyl p-phenylene diamine, sym-dinaphthyl p-phenylene diamine.

The reaction may be carried out with or without the aid of a dehydrating agent. The following chemicals or mixtures thereof may be used as dehydrating agents: calcium chloride, iodine, sulfanilic acid, phosphorus pentoxide, sodium hydroxide, magnesium perchlorate, acetic acid, barium oxide, zinc chloride, hydrochloric acid, sulfuric acid, etc. It is an advantage to use the amine-addition product with zinc chloride, for example $(C_6H_5NH_2)_2, ZnCl_2$, as a dehydrating agent.

The following is to be understood as merely illustrating the preparation and use of the ketone-amine reaction products and is not limiting thereof:

*Example 1.*—338 parts of diphenylamine, 550 parts of acetone and 2 parts of iodine are heated in an autoclave at a temperature of approximately 220° C. during 28 hrs. At the end of this time unreacted acetone is recovered by distillation and water which is formed during the reaction is also removed by distillation. The residual product is a black oil and weighs 411 parts. .75 part of the product is incorporated in the usual manner in a standard tire tread stock containing 100 parts rubber, 1¼ parts of mercaptobenzothiazole, and 42 parts carbon black.

*Example 2.*—The reaction product of acetone and phenyl beta-naphthylamine is made by heating an excess of acetone with phenyl beta-naphthylamine and a small quantity of iodine or other dehydrating agents at a temperature of 200° C. or higher during a prolonged time in an autoclave. At the end of this time excess of acetone and other low boiling materials are removed. It is advisable to remove unreacted phenyl-beta-naphthyl amine from the crude reaction product by distillation under vacuum. The product obtained in this way is a black paste having excellent antioxidant properties.

It is to be understood that a mixture of the reaction products may be used in rubber instead of a single reaction product. Also that a mixture of ketones or a single ketone may be reacted with a single amino compound or with a mixture of amino compounds to give products that may be used in rubber in the same manner.

It is to be understood that the procedures given in the illustrative examples are indicative of those that may be used in reacting a ketone and a di-(arylamino) arylene compound but that changes may be made in proportions and temperatures as will be apparent to those skilled in the art.

The chemicals disclosed may be used to improve the properties as mentioned herein of inner tubes, tires, thread, hose, dipped goods, mechanical goods, latex or articles made from latex, etc.

In the claims the term "ketone" is to be understood as meaning organic compounds containing one or more keto groups

but containing no carboxylic acid

or ester groups

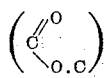

The term "rubber" is to be construed as including natural rubber, gutta percha, balata, synthetic rubber, or other rubber-like materials.

With the detailed description given above, it will be obvious that modifications will suggest themselves without departing from the principle of the invention, for example the product resulting from the reaction of a ketone and an aromatic amino compound may also be prepared by reacting the corresponding thioketone or the corresponding ketone dihalide with the amino compound, and it is not desired to limit the invention otherwise than as set forth in the appended claims.

Having thus described my invention, what I claim and desire to protect by Letters Patent is:

1. A process of improving the properties of rubber which comprises treating rubber with the reaction product of a ketone and a di-(arylamino) arylene compound.

2. A process of improving the properties of rubber which comprises treating rubber with the reaction product of an aliphatic ketone and a di-(arylamino) arylene compound.

3. A process of improving the properties of rubber which comprises treating rubber with the reaction product of acetone and a di-(arylamino) arylene compound.

4. A process of improving the properties of rubber which comprises treating rubber with the reaction product of acetone and a diaryl phenylene diamine.

5. A process of improving the properties of rubber which comprises treating rubber with the reaction product of acetone and a diphenyl phenylene diamine.

6. A process of improving the properties of rubber which comprises treating rubber with the reaction product of acetone and a dinaphthyl phenylene diamine.

7. A process of improving the properties of rubber which comprises treating rubber with the reaction product of acetone and sym-diphenyl p-phenylene diamine.

8. A process of improving the properties of rubber which comprises treating rubber with the reaction product of acetone and sym-dinaphthyl p-phenylene diamine.

9. A vulcanized rubber product containing rubber which has been vulcanized in the presence of the reaction product of a ketone and a di-(arylamino) arylene compound.

10. A vulcanized rubber product containing rubber which has been vulcanized in the presence of the reaction product of an aliphatic ketone and a di-(arylamino) arylene compound.

11. A vulcanized rubber product containing rubber which has been vulcanized in the presence of the reaction product of acetone and a di-(arylamino) arylene compound.

12. A vulcanized rubber product containing rubber which has been vulcanized in the presence of the reaction product of acetone and a diaryl phenylene diamine.

13. A vulcanized rubber product containing rubber which has been vulcanized in the presence of the reaction product of acetone and a diphenyl phenylene diamine.

14. A vulcanized rubber product containing rubber which has been vulcanized in the presence of the reaction product of acetone and a dinaphthyl phenylene diamine.

15. A vulcanized rubber product containing rubber which has been vulcanized in the presence of the reaction product of acetone and sym-diphenyl p-phenylene diamine.

16. A vulcanized rubber product containing rubber which has been vulcanized in the presence of the reaction product of acetone and sym-dinaphthyl p-phenylene diamine.

Signed at Montclair, county of Essex, State of New Jersey, this 18th day of September 1931.

WILLIAM P. ter HORST.